United States Patent [19]

Burkhardt et al.

[11] Patent Number: 4,822,420

[45] Date of Patent: * Apr. 18, 1989

[54] SEALING COMPOSITION FOR SOIL BARRIERS

[75] Inventors: Rudolf Burkhardt, Vettelschoss; Hansjürgen Hass; Reiner Hitze, both of Troisdorf; Günther Zoche, Bonn, all of Fed. Rep. of Germany

[73] Assignee: Huels Troisdorf AG, Cologne, Fed. Rep. of Germany

[*] Notice: The portion of the term of this patent subsequent to Sep. 2, 2003 has been disclaimed.

[21] Appl. No.: 18,684

[22] Filed: Feb. 25, 1987

[30] Foreign Application Priority Data

Feb. 27, 1986 [DE] Fed. Rep. of Germany ....... 3606313

[51] Int. Cl.⁴ .......................... C04B 35/16; C09K 3/00
[52] U.S. Cl. ................................ 106/74; 106/287.16; 106/900
[58] Field of Search ...................... 106/900, 74, 38.23, 106/38.35, 287.16

[56] References Cited

U.S. PATENT DOCUMENTS

| | | | |
|---|---|---|---|
| 2,842,445 | 7/1958 | Emblem et al. | 106/900 |
| 4,545,820 | 10/1985 | Mallow | 106/900 |
| 4,609,487 | 9/1986 | Burkhardt | 106/900 |

*Primary Examiner*—Theodore Morris
*Attorney, Agent, or Firm*—Felfe & Lynch

[57] ABSTRACT

Disclosed is a sealing composition for soil barriers. The composition is formed of 50 to 95% of a solids mixture of clay minerals and fillers, the clay mineral being 5 to 90% of the solids mixture; a binding agent which is a mixture of an aqueous solution of alkali water glass with a silane of the formula $R-Si(OR'_3)$ in which R is an aliphatic moiety of 1 to 6 carbon atoms, which may be substituted with reactive groups, and R' represents identical or different alkyl moieties of 1 to 4 carbon atoms; and water.

11 Claims, No Drawings

SEALING COMPOSITION FOR SOIL BARRIERS

BACKGROUND OF THE INVENTION

The subject matter of the present invention is in a sealing composition made from clay minerals, fillers, binding agents and water, with which permeable soils, e.g., sandy soils, can be sealed. The sealing compositions according to the invention can be put into the ground by known construction methods in the form of vertical barrier walls, horizontal barriers, e.g., bottom barriers, dump linings, dump covers, etc. The main purpose of these sealing compositions is to prevent the propagation, diffusion or spreading of soil contaminants and especially the penetration of pollutants into the ground water. The immobilization of pollutants can be improved in some cases by filling dump excavations with the sealing composition.

The use soil barriers against the spread of pollutants, such as dump seepage etc., is known in the art. Usually, the soil barriers are in the form of a pair of trench walls made by different methods and of different sealing compositions. These known techniques include the One-Phase Trench Wall and the Two-Phase Trench Wall.

In the One-Phase Trench Wall technique the soil barrier is formed of a composition which contains about 2 to 4 wt.-% sodium bentonite, 12.5 to 20 wt.-% cement, and 75 to 85 wt.-% water. The Two-Phase Trench Wall (Backfill Method) employs a composition which contains about 0.2 to 2 wt.-% sodium bentonite, 60 to 75 wt.-% soil (waste from trench), and 25 to 35 wt.-% water.

A one-phase composition has a low solids content of about 15 to 25 wt.-%. Accordingly, the one-phase composition has the disadvantage of a relatively high permeability, k (for water)=$10^{-7}$ to $10^{-8}$ m/s, and the danger of erosion. When the two components cement and bentonite, which are sensitive to chemicals, are in contact with pollutants, long-lasting, adequate protection of ground water is especially doubtful.

The two-phase composition has a higher solids content and a lower permeability (k=approximately $10^{-9}$ m/s). However, the permeability clearly can vary if there are relatively great differences in the composition of the excavated and back-filled soil. This composition remains permanently soft since it does not contain cement or any other binding agent. As such, there is a danger of erosion at points where the wall is adjacent to coarse loose rock or gravel. The resistance of these compositions to pollutants is unpredictable since their make-up differs from case to case, and has to be determined by individualized time consuming tests.

In view of the prior art disadvantages, bearing in mind that maximum reliability against pollutants is precisely what is expected of soil barriers, it is an object of the present invention to provide a sealing composition which will not have the above-discussed disadvantages, and which can be made and handled in a simple manner with conventional construction apparatus.

SUMMARY OF THE INVENTION

The present invention is in a sealing composition for soil seals. The composition is of clay minerals, fillers, binding agents and water.

The binding agent is a mixture of an aqueous solution of alkali water glass and trialkoxysilanes of the general formula R—Si(OR')$_3$ in which R is an aliphatic moiety of 1 to 6 carbon atoms. R can be substituted if desired with reactive groups. R' represents identical or different alkyl moieties of 1 to 4 carbon atoms.

The solids include a mixture of clay minerals and silicatic fillers, wherein the mixture of solids amounts to 50 to 95 percent, by weight, of the total composition, and the clay mineral content amounts to 5 to 90%, by weight, of the solids mixture.

The clay minerals contained in the composition are silicates having a layered lattice structure, preferably those of low swelling capacity and exchanger capacity, e.g., kaolinite and illite. Their total solid-material content amounts to 5 to 90% by weight. The remainder of the solids are silicatic fillers which are to be largely carbonate-free so as not to develop any carbon dioxide gas in contact with acid pollutants. The term, "silicatic fillers", as used herein, means finely divided silicatic and quartz rock in grain sizes of 1 micron to 20 millimeters. Examples of silicatic rock are slate, granite and basalt. The expression, "largely carbonate-free", is intended to mean that, when natural rock is used, it is to have a carbonate content of less than 0.5% by weight.

The binding agent is a mixture of aqueous alkali water glass solution, preferably commercial sodium silicate solution or the latter diluted to silica contents under 25 weight-percent and viscosities under 1,000 mPa·s (293 K), and a trialkoxysilane of the general formula R—Si(OR)$_3$. In this formula, R is an aliphatic moiety of 1 to 6 carbon atoms, which can be substituted by reactive groups, e.g., amino or mercapto groups, and R' represents identical or different alkyl moieties of 1 to 4 carbon atoms. Examples of such silanes are the methyl, ethyl, propyl and isobutyl trimethoxy or triethoxy silanes, as well as gamma-mercaptopropyltrimethoxysilane. The content of the alkyl alkoxysilanes in the mixture can vary between 0.1 to 20 wt.-%, and is preferably between 0.5 and 10 wt.-%.

The sealing composition can additionally contain an acid alkali phosphate, alkaline-earth phosphate or ammonium phosphate and/or phosphoric acid. With these additives, which are preferably mixed with the binding agent, the strength and stability of the sealing compositions can be controlled.

The sealing composition according to the invention is prepared by combining the components, the procedure differing according to the kind of mixer available. If a vessel with a stirrer is used, it is, for example, advantageous to fill it with the liquid binding agent mixture and stir in the solids individually or in mixture. In forced mixers (of the nature of a concrete mixer) a portion or all of the solids can be premixed and the liquid components can be added singly or as a binding agent mixture. Further information on the preparation of the binding agent and sealing compositions is contained in the Examples.

In the preparation of the sealing composition, the binding agent at first produces a liquefaction which makes it possible to incorporate very high solid contents, up to more than 90 wt.-%, without impairing workability. The beginning of setting can be determined by measuring the shear strength or the liquid flow limit of the composition. The initiation of setting can be adapted by the composition of the binding agent to a common working time of, e.g., 6 to 24 hours. The setting of the compositions leads to a plastic-elastic state of high cohesion, while the compressive strength rises to sufficient levels and the danger of erosion greatly decreases.

As the solid content increases, the permeability of the composition decreases under otherwise equal conditions, and its chemical resistance increases. Information on this can be derived from the results of lengthy permeability tests, among others. If, for example, the permeability of a composition for a particular liquid that is to be contained does not change materially within half a year or a whole year, it can be concluded that the liquid does not react chemically with the components of the composition nor change their structure physically.

EXAMPLE 1

10.8 g of 10% caustic soda solution is added with stirring to 27.9 g of 10% phosphoric acid solution, and then 18 g of propyltrimethoxysilane, which dissolves clear in 10 to 15 minutes. This solution is stirred into a mixture of 573.3 g of water and 120 g of sodium silicate solution (density=1.26 g/cm$^3$, weight ratio of SiO$_2$:Na$_2$O=3.85, SiO$_2$ content 22.3%). 562.5 g of finely ground fire clay and 1,687.5 g of fine quartz sand (grain diameter 0.06 to 0.7 mm) are added successively to this binding agent solution within 15 minutes with vigorous stirring. 3,000 g of Composition A according to the invention is obtained as an easily stirred, liquid product with a solid content of 75 wt.-%.

With 750 g of water instead of the binding agent, the same solids yield a Composition B which is hard to stir and will not set. Shear strengths are recorded in the Table below.

EXAMPLE 2

6.9 g of 10% soda lye is stirred into 17.7 g of 10% phosphoric acid, followed by 11.4 g of propyltrimethoxysilane. After the silane has completely dissolved, the solution is added to a mixture of 366 g of water and 78 g of sodium silicate solution (density=1.26 g/cm$^3$, weight ratio of SiO$_2$:Na$_2$O=3.85, SiO$_2$ content 22.3%). 630 g of finely ground fire clay and 1,890 g of fine quartz sand are vigorously stirred successively within 15 minutes into the binding agent thus obtained, and 3000 grams of Composition C according to the invention are obtained, which is still easily stirred in spite of 84% solids.

When 480 g of water is used instead of the binding agent, Composition D was obtained which had the same solids content, but which could be thoroughly mixed only with difficulty.

The initial liquefying action and the later setting of the binding agent can be seen in the shear strengths of the compositions:

| Composition | Shearing Strength in N/m$^2$ after | | | |
|---|---|---|---|---|
| | 30 min | 3 h | 6 h | 24 h |
| A (according to invention) | 10 | 15 | 90 | >300000 |
| B (not according to invention) | 120 | 130 | 240 | 230 |
| C (according to invention) | 190 | 120 | 111 | >300000 |
| D (not according to invention) | 3000 | 3150 | 2400 | 2400 |

EXAMPLE 3

Permeability testing of a composition according to the invention having a solid content of 83.3 wt.-%.

A. Preparation of the Composition

In a solution of 1.86 g H$_3$PO$_4$ and 0.72 g NaOH in 27.42 g of water, 12 g of propyltrimethoxysilane was dissolved with stirring, and the solution thus obtained was stirred into a mixture of 378 g of water and 80 g of sodium silicate solution (density=1.26 g/cm$^3$, SiO$_2$:Na$_2$O ratio by weight=3.85). Within 15 minutes, 625 g of finely ground fire clay and 1875 g of fine quartz sand were successively added and mixed in.

B. Testing

The composition was placed in a cell for performing uniaxial tests in a layer 10 cm thick and 10 cm in diameter, in which it hardened in about 20 hours. 48 hours after preparation, a test liquid was placed atop the sample resting on water-saturated sand and the amount of fluid that penetrated and the amount that passed through per day were measured.

| Test liquid | Hydraulic Gradient I | Permeability Factor k [m/s] | | |
|---|---|---|---|---|
| | | after 10 days | after 50 days | after 100 days |
| Water | 16.0 | 6 · 10$^{-11}$ | 7 · 10$^{-11}$ | 6 · 10$^{-11}$ |
| Triethanolamine, 5% in water | 16.2 | 6 · 10$^{-11}$ | 6 · 10$^{-11}$ | 6 · 10$^{-11}$ |
| Propionic acid, 5% in water | 15.8 | 7 · 10$^{-11}$ | 8 · 10$^{-11}$ | 8 · 10$^{-11}$ |
| Dump seepage* | 15.0 | 9 · 10$^{-11}$ | 2 · 10$^{-10}$ | 1 · 10$^{-10}$ |

*Composition:
NH$_4$Cl: 23.73 g/l; Na$_2$SO$_4$: 5.92 g/l
NaCl: 138.90 g/l; (NH$_4$)$_2$SO$_4$: 4.00 g/l
Phenol: 350 mg/l; toluene: 10 mg/l
CH$_2$Cl$_2$: 50 mg/l; pH = 6

EXAMPLE 4

Permeability testing of a composition according to the invention which has a solid content of 75 wt.-%.

A. Preparation of the Composition

In a solution of 100 g of sodium silicate (density=1.26 g/cm$^3$, SiO$_2$:Na$_2$O weight ratio=3.85) in 509.5 g of water, 12 g of propyltrimethoxysilane and 3.5 g of gamma-mercaptopropyltrimethoxysilane were dissolved, with stirring. To this binding agent were added, successively, 950 g of finely ground fire clay, 725 g of powdered quartz and 200 g of fine quartz sand.

B. Testing

The composition was treated and tested as described in Example 3.

| Test Liquid | Hydraulic Gradient I | Permeability Factor k [m/s] | | |
|---|---|---|---|---|
| | | after 10 days | after 50 days | after 100 days |
| Water | 16.1 | 8 · 10$^{-11}$ | 8 · 10$^{-11}$ | 4 · 10$^{-11}$ |

It will be understood that the specification and examples are illustrative but not limitative of the present invention in that other embodiments within the spirit and scope of the invention will suggest themselves to those skilled in the art.

We claim:

1. A sealing composition for soil barriers comprising: a solids mixture of clay minerals and silicatic fillers having a clay mineral content of 5 to 90% by weight of the solids mixture, said solids mixture amounting to 50 to 95 wt.-% of the total composition; a binding agent, said binding agent being a mixture of an aqueous solution of alkali water glass with a trialkoxysilane of the general formula R—Si(OR')$_3$ in which R is an aliphatic moiety of 1 to 6 carbon atoms, and R' represents identical or different alkyl moieties of 1 to 4 carbon atoms; and water.

2. The sealing composition of claim 1 wherein R is substituted with a reactive group.

3. The sealing composition of claim 1 wherein the amount of alkali water glass solution in the binding agent corresponds to an $SiO_2$ content of 1 to 25 wt.-%.

4. The sealing composition of claim 3 wherein the amount of trialkoxysilanes is 0.5 to 10 wt.-%.

5. The sealing composition of claim 1 further comprising an acid alkali phosphate, alkaline earth phosphate or ammonium phosphate and/or phosphoric acid.

6. The sealing composition of claim 1 wherein the clay mineral is kaolinite, illite or a mixture thereof.

7. The sealing composition of claim 1 wherein the silicatic filler is slate, granite, basalt or mixtures thereof.

8. The sealing composition of claim 1 wherein the silicatic filler has a carbonate content not in excess of about 0.5% by weight of the filler.

9. The sealing composition of claim 1 wherein R is propyl.

10. The sealing composition of claim 9 wherein R' is methyl.

11. The sealing composition of claim 1 wherein R is gamma-mercaptopropyl.

* * * * *